April 14, 1970     C. E. DELAMATER     3,506,216
PNEUMATIC SYSTEM CARRIER CLOSURE CONSTRUCTION
Filed April 4, 1968     2 Sheets-Sheet 1
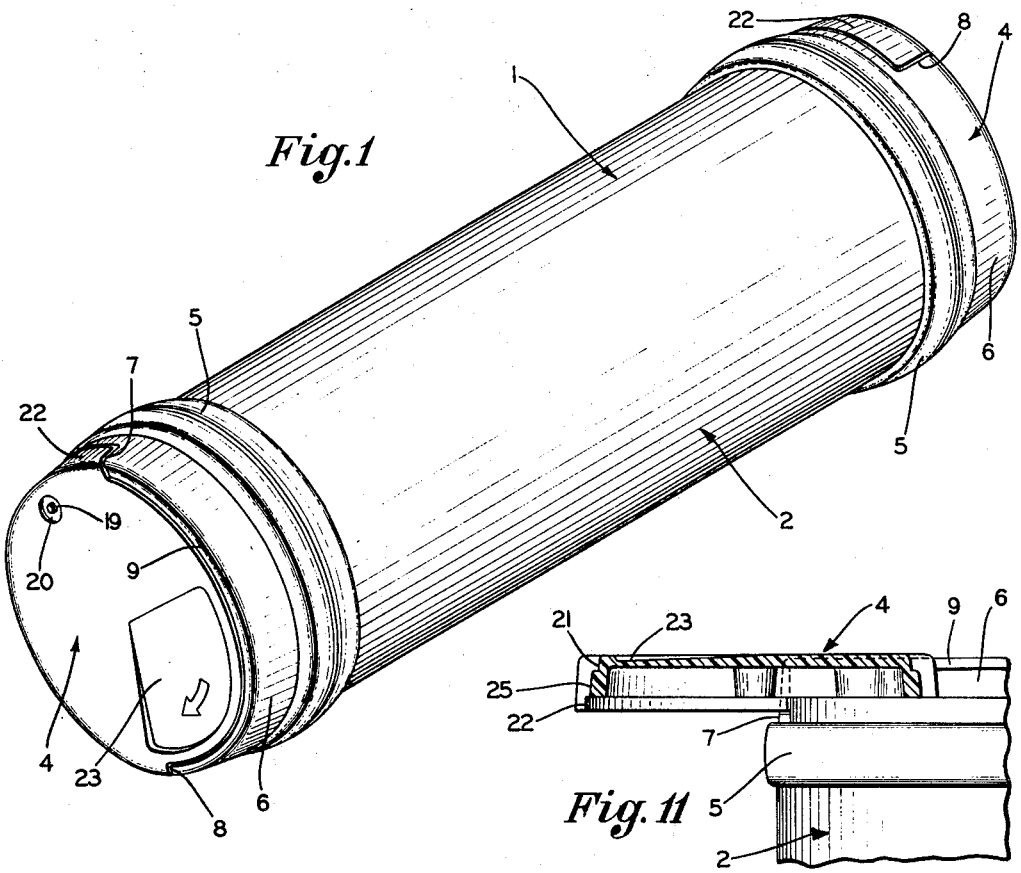
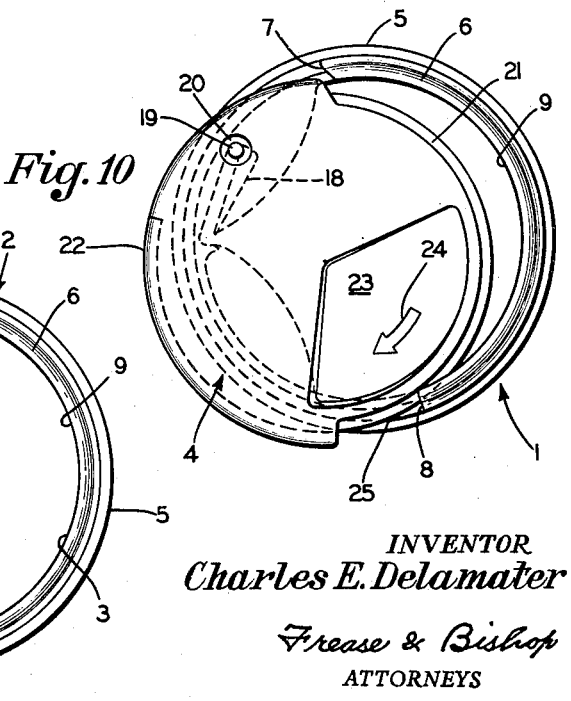
INVENTOR
Charles E. Delamater
Frease & Bishop
ATTORNEYS April 14, 1970     C. E. DELAMATER     3,506,216
PNEUMATIC SYSTEM CARRIER CLOSURE CONSTRUCTION
Filed April 4, 1968     2 Sheets-Sheet 2
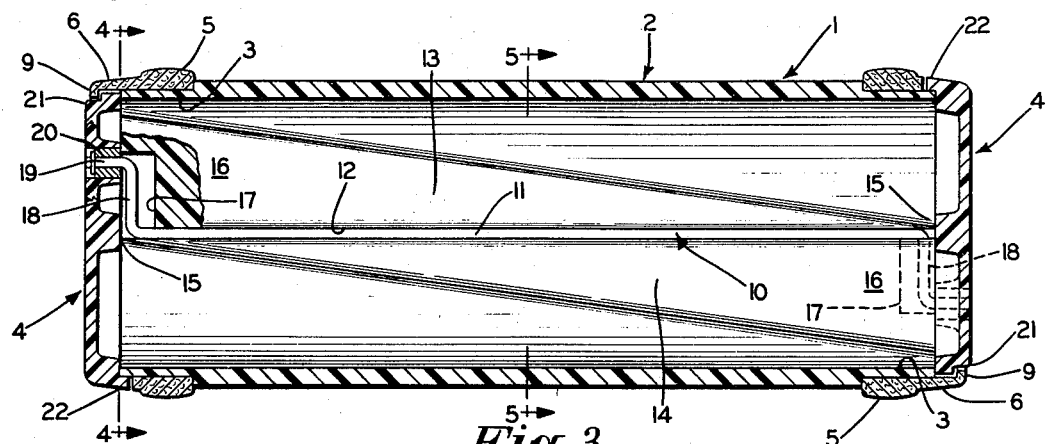
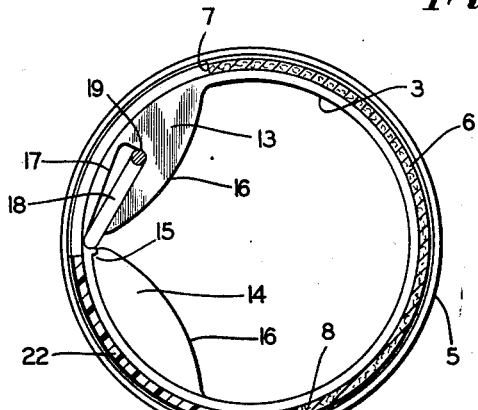
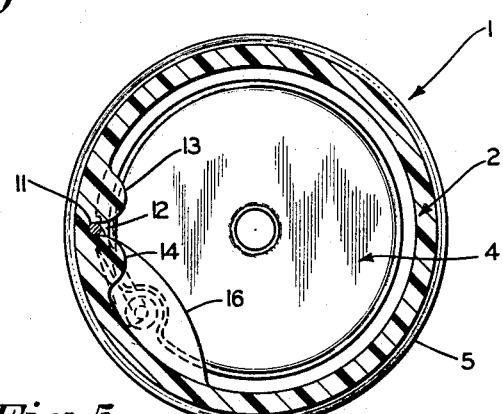
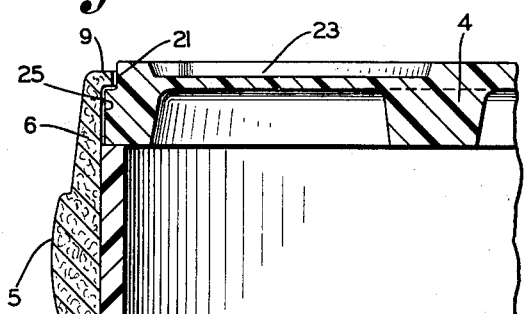
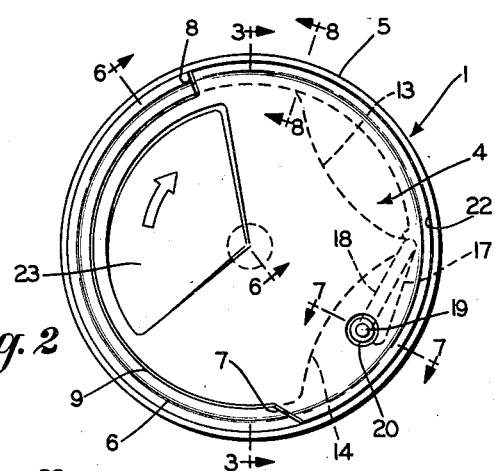
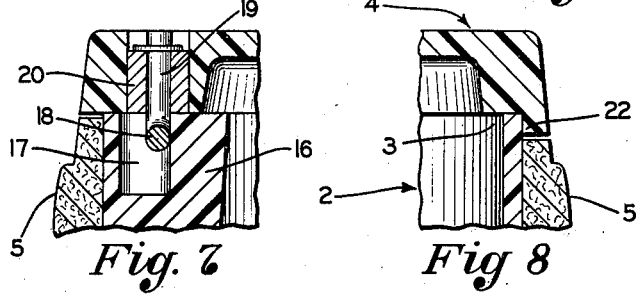
INVENTOR
Charles E. Delamater
Frease & Bishop
ATTORNEYS

United States Patent Office

3,506,216
Patented Apr. 14, 1970

3,506,216
PNEUMATIC SYSTEM CARRIER CLOSURE CONSTRUCTION
Charles E. Delamater, Canton, Ohio, assignor to Diebold, Incorporated, Canton, Ohio, a corporation of Ohio
Filed Apr. 4, 1968, Ser. No. 718,773
Int. Cl. B65g 51/04; B65d 43/16
U.S. Cl. 243—35           11 Claims

ABSTRACT OF THE DISCLOSURE

A closure construction and arrangement for an open end of a material-conveying carrier for a pneumatic tube system, particularly adapted for conducting banking transactions. A disc-like member forms the closure and is pivotally mounted for lateral movement across an open end of the carrier between fully closed and fully opened positions. The pivot point is movable and is located on one end of a crank-shaped torsion bar mounted on the carrier body. The torsion bar permits opening and closing movement of the closure member and holds the closure spring-pressed in closed position.

BACKGROUND OF THE INVENTION

Field of the invention

The invention relates to a carrier for banking materials which moves through a pneumatic tube in performing banking services from a remote customer's station. In accordance with the invention, the carrier body is hollow or tubular and has at least one open end to provide access to the interior of the carrier. The open end normally is covered by a movable closure which must be readily movable between opened and closed positions. The closure also must be held securely in closed position when closed. The compartment in the hollow carrier body and the size of the open end must be as large as possible and should not be restricted by the construction and mounting of the closure or of the means controlling closure operation. The carrier body preferably should be transparent.

Description of the prior art

Many closure arrangements for pneumatic tube system carrier access openings have been used. Prior transparent carriers for conducting banking services have used complicated mountings and latches for the closure means for an open end of the carrier body. The mounting and latching mechanisms have been subject to injury in use, and the closure mounting structure has reduced the size of the carrier compartment and its open end.

SUMMARY OF THE INVENTION

Objectives of the invention include providing a pneumatic tube system carrier access opening closure construction for a transparent carrier which may be readily moved between opened and closed positions, which is effectively held in closed position when closed, and which does not materially reduce the internal volume of the carrier or the size of the access opening; and providing a closure construction eliminating difficulties heretofore encountered, achieving the stated objectives simply, effectively and inexpensively, and solving problems and satisfying existing needs.

These objectives and advantages are obtained by the pneumatic tube system carrier access opening closure construction, the general nature of which may be stated as including a generally tubular transparent plastic material carrier body having two ends and open at least at one end; closure means for said open end including a disc-like closure member conforming in contour generally to the contour of the open end of the carrier body; a rod-like torsion bar having an elongated torsion-section extending generally longitudinally of the carrier body parallel to the carrier body axis and mounted on the carrier body wall, said torsion-section terminating in a crank-shaped end movable laterally of the carrier body at the open carrier end and terminating in a crank pin extending in a direction longitudinal of the carrier body and parallel to the carrier body axis; said closure member being pivotally mounted on and movable with said crank pin; interengageable flange means on the open end of the carrier body and on the closure member preventing axial separation of the closure member and carrier body when the closure member is in closed position; abutment means interengageable between the closure member and carrier body moving said crank pin laterally away from the carrier body axis when the closure member is rotated on said crank pin to move the closure member from closed to opened position; and said torsion-section and said abutment means normally reacting to hold said closure member in closed position when said closure member is in closed position.

BRIEF DESCRIPTION OF THE DRAWING

A preferred embodiment of the invention—illustrative of the best mode in which applicant has contemplated applying the principles—is set forth in the following description and shown in the drawings and is particularly and distinctly pointed out and set forth in the appended claims.

FIGURE 1 is a perspective view of a carrier provided with the improved closure construction;

FIG. 2 is an end view of the right-hand end of the carrier shown in FIG. 1;

FIG. 3 is a longitudinal cross section of the carrier taken on the line 3—3, FIG. 2;

FIG. 4 is a section taken on the line 4—4, FIG. 3;

FIG. 5 is a section taken on the line 5—5, FIG. 3;

FIG. 6 is an enlarged fragmentary sectional view taken on the line 6—6, FIG. 2;

FIG. 7 is a fragmentary view looking in the direction of the arrows 7—7, FIG. 2;

FIG. 8 is a fragmentary sectional view looking in the direction of the arrows 8—8, FIG. 2;

FIG. 9 is an end view looking toward the left-hand end of the carrier shown in FIG. 1, with the closure in opened position;

FIG. 10 is a view similar to FIG. 9 but showing the closure just as it starts to move from closed to opened position; and FIG. 11 is a sectional view looking in the direction of the arrows 11—11, FIG. 9.

Similar numerals refer to similar parts throughout the drawing.

DESCRIPTION OF THE PREFERRED EMBODIMENT

The pneumatic tube system carrier 1 has a carrier body generally indicated at 2 which is generally tubular in shape and preferably is formed of transparent plastic material. Body 2 may have either one or two open ends, two open ends 3 being illustrated. Each open end 3 is covered or closed by a disc-like closure member generally indicated at 4.

Usual accelerator band means 5 are mounted on and surround the carrier body 2 and project outwardly of the body adjacent to and spaced from each end 3 of the body. The bands 5 may be formed integrally with a carrier body curved extension 6 circumferentially surrounding a portion of the open end 3 of the body and extending approximately 180° around the band 5, as shown in FIGS. 1, 4, 9, and 10. Extension 6 terminates in abutment ends 7 and 8. The outer end of curved extension 6 preferably terminates in an inturned flange 9 (FIGS. 3 and 6).

A torsion member generally indicated at 10 has its torsion-section 11 extending longitudinally of body 2 parallel with the axis of the body. Torsion-section 11 is preferably mounted in and held in a groove 12 (FIGS. 3 and 5) in the body wall. Groove 12 preferably is formed by two ribs 13 and 14 projecting integrally internally of the wall of tubular body 2. Each rib 13 and 14 is tapered from a point 15 at one end to an enlarged base 16 at the other end. Rib 14 has its enlarged base 16 at one end 3 of the body 2 and rib 13 has its enlarged base 16 at the other end 3 of the body 2, the left-hand end viewing FIG. 3.

A recess 17 which opens toward an outer end of the body 2 is formed in each enlarged rib base 16. Each end of torsion-section 11 of torsion bar 10 is formed with a crank-shaped end 18 extending into and movable in the recess 17. Each crank-shaped end 18 is formed with a crank pin 19 projecting from an end of the carrier 1 parallel to the axis of the carrier body 2. Each closure member 4 is pivotally mounted at 20 on a crank pin 19. The crank pin-pivot mounting 19–20 of a closure member 4 is located circumferentially nearer one abutment end 7 of extension 6 than the other abutment end 8 thereof (FIGS. 1, 9, and 10).

Each closure member 4 is provided with a circumferentially extending angular recess 21 complementary in shape to the shape of extension 6 and inturned flange 9 (FIGS. 2, 6, and 10). Each closure member 4 also is provided with a circumferentially segmental axially extending return flange 22 (FIGS. 1 and 8) which surrounds an open end 3 of body 2 when the closure member 4 is in closed position (FIGS. 2 and 8). Closure return flange 22 extends circumferentially from abutment end 7 to abutment end 8 of carrier body extension 6.

Thus, closure member 4 and its flange portion 22, and body extension 6 and its flange portion 9 present a substantially completely closed end for carrier 1 when closure 4 is in closed position (FIGS. 1 and 2).

Each closure 4 may be provided with a finger-receiving recess 23 in which the finger or thumb of a user may be engaged for moving closure member 4 between closed and opened positions. Viewing FIGS. 10 and 11, when a closure member 4 is in closed position and is pushed in the direction of the arrow 24, the pivot location of crank pin 19 is moved from the position illustrated in FIGS. 4 and 9 in recess 17 closer to the axis of the body 2, to the position shown in FIG. 10 as circumferential edge 25 of closure member 4 cams across abutment end 8 of body extension 6 in toggle-like fashion.

After moving toward open position, beyond the position shown in FIG. 10, closure member 4 pivots freely on crank pin 19 to the position shown in FIG. 9, when substantially the entire open end of the carrier 1 is exposed. Recess 17 and torsion portion 11 of torsion bar 10 permits movement of the crank portion 18 of torsion member 10 in recess 17 between the positions of FIGS. 9 and 10. The torsion pressure tends to hold crank portion 18 in the position of FIGS. 2 and 4 when closure member 4 is in closed position and holds the closure portion in such position in a spring-pressed fashion.

The flange 9 on extension 6, interengageable with the recess 21 on closure member 4 prevents axial separation of the closure member 4 from the carrier body 2 when the closure is in closed position.

When a closure is provided for each end of carrier body 2, as illustrated, the crank ends 18 and crank pins 19 and torsion portion 11 mutually cooperate to hold the closure members in closed position. If only one closure member is mounted only at one end of a carrier having only one open end, the opposite end of the torsion portion 11 of torsion bar 10 must be fixed to the carrier body against rotation so that torsion action may be exerted upon the closure member 4 which it controls.

The improved construction is very simple and provides an effective and sturdy closure construction for pneumatic tube carrier bodies, provides a torsion bar control member which is not subject to damage or breakage in use, provides a structure which eliminates difficulties encountered with prior devices, achieves the objectives and solves existing problems in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved carrier is constructed and used, the characteristics of the new construction, and the advantageous, new and useful results obtained; the new and useful structures, devices, elements, arrangements, parts and combinations, and mechanical equivalents obvious to those skilled in the art.

I claim:

1. Closure construction for a pneumatic tube carrier including a generally tubular carrier body having two ends at least one of which is open; a disc-like closure member for said open end conforming in contour generally to the contour of said open carrier body end; a rod-like torsion bar having an elongated torsion-section mounted on the carrier body extending parallel to the carrier body axis; said torsion-section terminating at one end in a crank portion movable laterally of the body at said open end and formed with a crank pin extending parallel to said carrier body axis; said closure member being pivotally mounted on and movable with said crank pin; means holding the other end of said torsion-section fixed against rotation relative to the carrier body so that torsion action may be exerted upon the closure member, flange means on said carrier body and closure member interengaged when said closure member is in closed position to prevent axial separation of the closure member from said body; abutment means interengageable between the closure member and body to move the crank pin laterally away from the carrier body axis when the closure member is rotated on said crank pin to move from closed to opened position; and said torsion-section reacting normally to hold said closure member in closed position when the closure member is in closed position.

2. The construction defined in claim 1 in which the carrier body is formed of transparent plastic material for carrier contents visibility.

3. The construction defined in claim 1 in which the mounting for the torsion-bar torsion-section comprises two ribs projecting inward of the tubular body forming a groove in which said torsion-section is received.

4. The construction defined in claim 3 in which each rib is tapered in form extending from a point at one end of the body to an enlarged base at the other end of the body.

5. The construction defined in claim 4 in which the enlarged base of a rib is formed with an end opening recess wherein the crank portion moves laterally when the closure member moves between opened and closed positions.

6. The construction defined in claim 1 in which the carrier body is open at each end, in which there is a closure member for each open end of the carrier body, and in which the torsion-bar has a crank portion at each end of the torsion-section.

7. Closure construction for a pneumatic tube carrier including a generally tubular carrier body having two open ends; a disc like closure member for each open end conforming in contour generally to the contour of such open carrier body end; a rod like torsion bar having an elongated torsion-section mounted on the carrier body and extending therethrough parallel to the carrier body axis; said torsion-section terminating at each end in a crank portion movable laterally of the body at said open ends and formed with a crank pin extending parallel to said carrier body axis; said closure members being pivotally mounted on and movable with said crank pins whereby when one closure member is moved to its open position the other closure member is prevented from moving to its open position; flange means on the ends of said carrier body and closure members interengaged when said closure members are in closed position to prevent axial separation of the closure members from the body; abutment means interengageable between the closure members and body to move either crank pin laterally away from the carrier body axis when the corresponding closure member is rotated on said crank pin to move from closed to open position; and said torsion-section reacting normally to hold said closure members in closed position when the closure members are in closed position.

8. The construction defined in claim 7 in which the carrier body is formed of transparent plastic material for carrier contents visibility.

9. The construction defined in claim 7 in which the mounting for the torsion bar torsion-section comprises two ribs projecting inward of the tubular body forming a groove in which said torsion-section is received.

10. The construction defined in claim 9 in which each rib is tapered in form extending from a point at one end of the body to an enlarged base at the other end of the body.

11. The construction defined in claim 10 in which the enlarged base of each rib is formed with an end opening recess wherein the adjacent crank portion moves laterally when the corresponding closure member moves between open and closed positions.

References Cited
UNITED STATES PATENTS

| | | | |
|---|---|---|---|
| 413,557 | 10/1889 | Rehfuss | 243—35 |
| 1,910,033 | 5/1933 | Mincovsky | 270—38 |
| 3,323,755 | 6/1967 | Voitas | 243—35 |

HARVEY C. HORNSBY, Primary Examiner

U.S. Cl. X.R.

220—38; 243—39